(12) United States Patent
Prusak et al.

(10) Patent No.: US 8,501,866 B2
(45) Date of Patent: Aug. 6, 2013

(54) COLORANT CONCENTRATES FOR THERMOPLASTIC BIOFIBER COMPOSITES

(75) Inventors: Peter Prusak, Cleveland, OH (US); Thomas M. Majewski, Parma, OH (US)

(73) Assignee: PolyOne Corporation, Avon Lake, OH (US)

( * ) Notice: Subject to any disclaimer, the term of this patent is extended or adjusted under 35 U.S.C. 154(b) by 0 days.

(21) Appl. No.: 12/890,527

(22) Filed: Sep. 24, 2010

(65) Prior Publication Data

US 2011/0012274 A1   Jan. 20, 2011

Related U.S. Application Data

(62) Division of application No. 11/934,649, filed on Nov. 2, 2007, now Pat. No. 7,829,628.

(60) Provisional application No. 60/864,238, filed on Nov. 3, 2006.

(51) Int. Cl.
*C08G 18/38* (2006.01)
*C08K 9/00* (2006.01)
*B60C 1/00* (2006.01)

(52) U.S. Cl.
USPC ............ 524/570; 524/35; 524/581; 523/206; 523/351

(58) Field of Classification Search
USPC .................... 523/206, 351; 524/35, 581, 570
See application file for complete search history.

(56) References Cited

U.S. PATENT DOCUMENTS

| | | | | |
|---|---|---|---|---|
| 5,795,940 | A * | 8/1998 | Pearce et al. | 525/222 |
| 6,749,932 | B1 * | 6/2004 | Gould | 428/327 |
| 6,784,230 | B1 * | 8/2004 | Patterson et al. | 524/13 |
| 7,829,628 | B2 * | 11/2010 | Prusak et al. | 524/570 |
| 7,902,274 | B2 * | 3/2011 | Prusak et al. | 523/206 |
| 2004/0232581 | A1 * | 11/2004 | Hills | 264/75 |
| 2005/0137313 | A1 * | 6/2005 | Wong et al. | 524/487 |

* cited by examiner

*Primary Examiner* — Hannah Pak
(74) *Attorney, Agent, or Firm* — PolyOne Corporation

(57) ABSTRACT

Color concentrates for thermoplastic biofiber composites are disclosed. The concentrates employ three factors to achieve concentrated delivery of color to the processing machine and excellent and substantially uniform dispersion of color in the processing machine: melt flow of the concentrate exceeding at least 4 g/10 min. using ASTM D-1238; pellet size of the concentrate such that at least 50 pellets weigh less than one gram; and weight percent of the colorant ingredients in the concentrate exceeding at least 30 weight percent.

7 Claims, No Drawings

US 8,501,866 B2

COLORANT CONCENTRATES FOR THERMOPLASTIC BIOFIBER COMPOSITES

CLAIM OF PRIORITY

This application claims priority from U.S. Provisional Patent Application Ser. No. 60/864,238 bearing and filed on Nov. 3, 2006, which is incorporated by reference.

FIELD OF THE INVENTION

This invention relates to colorant concentrates useful for making thermoplastic biofiber composites appear to be naturally-colored or stained wood.

BACKGROUND OF THE INVENTION

Plastic has taken the place of other materials in a variety of industries. In the packaging industry, plastic has replaced glass to minimize breakage, reduce weight, and reduce energy consumed in manufacturing and transport. In other industries, plastic has replaced metal to minimize corrosion, reduce weight, and provide color-in-bulk products.

Recently, plastic has begun to replace wood in building materials where the wood is susceptible to rotting, warping, or discoloration. The advent of thermoplastic biofiber composites has made outdoor decks, porches, railings and stairways more durable. With structural issues resolved, the next key factor is making the plastic composite look like naturally-colored or stained wood.

Much like any assembly line, modules of ingredients come together at a final article formation station. For example, an extruder for deck planks might have as ingredients the thermoplastic resin, wood fiber or wood flour, and one or more "masterbatches" of additives.

These masterbatches are mixtures of a plastic resin and specialized, expensive additives, with the resin serving as a carrier for the additive. The most common specialized, expensive additive is colorant.

Pellet-based concentrates for colorant applications have be used at high dilution or "letdown" ratios to achieve good color distribution.

As with any modern manufacturing facility, production runs of thermoplastic composites made into final articles need to be very efficient. In the scale-up of production runs for one quantity of final product, the amount and choice of ingredients in the colorant concentrate can be quite different from the amount and choice of ingredients in the colorant concentrate for production runs for a different quantity of that same product. In other words, no two colorant concentrates are likely to be the same, because of the need to match color precisely, but there are significant issues in attempting to mix a colorant concentrate into a thermoplastic biofiber compound to make simulated wood products.

SUMMARY OF THE INVENTION

What the art needs is a colorant concentrate suitable for a production run that is most efficient according to the quantity of colored thermoplastic biofiber composite needed for inventory and just-in-time processing, without sacrificing the appearance of the final simulated wood product.

The present invention solves this problem in the art by combining three factors to achieve concentrated delivery of color to the processing machine and excellent and substantially uniform dispersion of color in the processing machine:

(a) melt flow of the concentrate exceeding at least 4 g/10 min. using ASTM D-1238;

(b) pellet size of the concentrate such that at least 50 pellets weigh less than one gram; and (c) weight percent of the colorant ingredients in the concentrate exceeding at least 30 weight percent.

The combination of these three factors has been found to provide excellent color dispersion in the making of thermoplastic biofiber composites to form simulated wood articles.

Highly-filled colorant concentrates are fragile items. If there is not enough carrier resin to bind together the colorant particles, then the color distribution of the final product is totally unsatisfactory resulting in waste. The same wasted effort and material occurs if the carrier resin does not have the appropriate melt flow characteristics to adequately disperse within the melt-mixing apparatus, such as an extruder or a molding machine. If the pellets are even conventional size, e.g., 40 pellets per gram, there is the possibility that there is not sufficient surface area per pellet to adequately disperse highly-filled color concentrates.

Thus, one aspect of the invention is a highly-filled colorant concentrate for a thermoplastic biofiber composite, comprising: pellets comprising carrier resin and colorant, wherein (a) melt flow index of the concentrate exceeding at least 4 g/10 min. using ASTM D-1238; (b) size of the pellets results in at least 50 pellets having a total mass of less than one gram; and (c) weight percent of colorant exceeds at least 30 weight percent of the weight of the concentrate.

"Colorant" means dyes or pigments.

EMBODIMENTS OF THE INVENTION

Carrier Resin

Any thermoplastic resin that is compatible or miscible with the thermoplastic of the thermoplastic biofiber composite can be selected to serve as the carrier resin for the concentrates of the present invention.

Non-limiting examples of such thermoplastic resins include polyolefins, polyamides, styrenics, polyesters, acrylics, polycarbonates, and others conventionally used as carrier resins for colorant concentrate products and blends thereof, with olefins being preferred because of the ubiquity of polyolefin-based thermoplastic biofiber composites. Of the olefins, low-density polyethylene (LD-PE), linear-low density polyethylene (LLD-PE), and polypropylene (PP) are particularly preferred.

The resin can have any melt flow index value sufficient to cause the colorant concentrate to have a minimum melt flow index of at least 4 g/10 min. using ASTM D-1238 (which is measured using a weight of 2.16 kg and a temperature of 190° C. for PE and 230° C. for PP). Desirably, the resin should have a melt flow index value sufficient to cause the colorant concentrate to have a minimum melt flow index of at least 6 g/10 min. Preferably, the resin should have a melt flow index value sufficient to cause the colorant concentrate to have a minimum melt flow index of at least 8 g/10 min.

Within these considerations and recognizing that all ingredients of the concentrate contribute to melt flow, the resins, or blends of them, useful in the present invention have a melt flow index of at least 20 g/10 min., desirably at least about 30 g/10 min., and preferably at least about 50 g/min. and even more preferably in excess of 100 g/min. if such resins are reasonable in cost and available.

Non-limiting examples of commercially available thermoplastic resins having melt flow indices within the acceptable ranges include LDPE from Dow Chemical, LLDPE from CP Chem and Dow Chemical, and PP from Basell and Huntsman.

Colorant

As explained above, colorant can be a pigment, a dye, a combination of pigments, a combination of dyes, a combination of pigments and dye, a combination of pigment and dyes, or a combination of pigments and dyes. The choice of colorants depends on the ultimate color desired by the designer for the plastic article.

For thermoplastic biofiber composites intended to simulate the appearance of wood while providing the durability of thermoplastic compounds, the importance of colorants in outdoor usage is a significant factor to the selection of colorant or colorant combinations. Long-term aging studies of articles made from compounds that include colorant concentrates of the present invention are needed to assure that the desired color remains for the desired duration and otherwise ages well as would the wood it is intending to simulate. Therefore, one skilled in the art without undue experimentation can pick and choose colorants from those listed below, and others known in the industry, in order to find both an initial color match and a suitably durable coloration for the simulated wood product.

While most circumstances of usage for thermoplastic biofiber composites are likely to be exterior building materials, exposed to the environmental elements of their locations, it is also possible that such composites will be employed within interior locations where climate can be controlled. Whereas inorganic pigments might be preferred for the exterior locations, both organic pigments and dyes might be useful for the interior locations, according to the choices of the skilled polymer chemist, architect, and others.

The science of color is well known to those skilled in the art. Without undue experimentation, one can use color matching techniques to identify a particular location in spherical color space. For example, one skilled in the art can use the teachings of PCT Patent Publication WO/2004/095319 to digitally map color space using specific polymer carriers and colorants as raw material ingredients. Alternatively, one can make small samples called plaques for visual review.

Colorants are commercially available from a number of sources well known to those skilled in the art. Commercially available pigments are well known to those skilled in the art and include organic and inorganic colorant chemistries. Commercially available dyes are well known to those skilled in the art and include all organic chemistries. Commercial sources for pigments and dyes include multinational companies such as BASF, Bayer, Ciba-Geigy, Color-Chem International, Sun Chemical, Zhuhai Skyhigh Chemicals, and others identified at Internet Web Sites such as http://www.colorpro.com/info/vendors/colorant.html and http://dir.yahoo.com/Business_and_Economy/Business_to_Business/Chemicals_and_Allied_Products/Pigments_and_Dyes/

Table 1 lists 61 commercially available pigment colorants in a variety of primary and secondary colors, 54 chromatics, 5 blacks, and 2 whites.

TABLE 1

Commercial Pigment Colorants

| Raw Material Name | CI Name | Family | COLOR |
|---|---|---|---|
| TIOXIDE R-FC6 WHITE TiO$_2$ | PIGMENT WHITE 6 | INORGANIC | WHITE |
| TIONA 696 | PIGMENT WHITE 6 | INORGANIC | WHITE |
| REGAL 660R BLACK POWDER | PIGMENT BLACK 7 | ORGANIC | BLACK |
| MPC CHANNEL BLACK | PIGMENT BLACK 7 | ORGANIC | BLACK |
| BK-5099 BLACK OXIDE | PIGMENT BLACK 11 | INORGANIC | BLACK |
| 9880 METEOR PLUS HIGH IR JET BLACK | PIGMENT BROWN 29 | INORGANIC | BLACK |
| 10% FURNACE BLACK | PIGMENT BLACK 7 | INORGANIC | BLACK |
| HELIOGEN BLUE K7090 | PIGMENT BLUE 15:3 | ORGANIC | BLUE |
| HELIOGEN BLUE K6903 | PIGMENT BLUE B 15:1 | ORGANIC | BLUE |
| 34L2000 AZURE BLUE | PIGMENT BLUE 28 | INORGANIC | BLUE |
| 34L2001 AMAZON BLUE | PIGMENT BLUE 36 | INORGANIC | BLUE |
| NUBIX G-58 ULTRAMARINE BLUE | PIGMENT BLUE 29 | INORGANIC | BLUE |
| NUBIX C-84 ULTRAMARINE BLUE | PIGMENT BLUE 29 | INORGANIC | BLUE |
| NUBIX E-28 ULTRAMARINE BLUE | PIGMENT BLUE 29 | INORGANIC | BLUE |
| ENSIGN BLUE 214 | PIGMENT BLUE 28 | INORGANIC | BLUE |
| HELIOGEN GREEN K-8730 | PIGMENT GREEN 7 | ORGANIC | GREEN |
| HELIOGEN GREEN K 8605 | PIGMENT GREEN 7 | ORGANIC | GREEN |
| CHROMIUM OXIDE GREEN G-6099 | PIGMENT GREEN 17 | INORGANIC | GREEN |
| CROMOPHTAL ORANGE GP | PIGMENT ORANGE 64 | ORGANIC | ORANGE |
| 2920 BRILLIANT ORANGE | PIGMENT ORANGE 79 | ORGANIC | ORANGE |
| NOVAPERM RED F5RKA | PIGMENT RED 170 | ORGANIC | RED |
| 225-2480 SUNBRITE SCARLET 60:1 | PIGMENT RED 60:1 | ORGANIC | RED |
| IRGALITE RED LCB | PIGMENT RED 53:1 | ORGANIC | RED |
| DCC-2782 BARIUM 2B RED | PIGMENT RED 60:1 | ORGANIC | RED |
| LITHOL SCARLET 4451 | PIGMENT RED 48:2 | ORGANIC | RED |
| CROMOPHTAL RED 2020 | PIGMENT VIOLET 19 | ORGANIC | RED |
| CROMOPHTAL MAGENTA P | PIGMENT RED 202 | ORGANIC | RED |
| CROMOPHTAL PINK PT | PIGMENT RED 122 | ORGANIC | RED |
| PALIOGEN RED K 3911 HD | PIGMENT RED 178 | ORGANIC | RED |
| CROMOPHTAL RED 2030 | PIGMENT RED 254 | ORGANIC | RED |
| CROMOPHTAL RED 2028 | PIGMENT RED 254 | ORGANIC | RED |
| COLORTHERM RED 110M | PIGMENT RED 101 | INORGANIC | RED |
| COLORTHERM RED 130M | PIGMENT RED 101 | INORGANIC | RED |

TABLE 1-continued

Commercial Pigment Colorants

| Raw Material Name | CI Name | Family | COLOR |
|---|---|---|---|
| COLORTHERM RED 180M | PIGMENT RED 101 | INORGANIC | RED |
| BAYFERROX 180M RED | PIGMENT RED 101 | INORGANIC | RED |
| R481 RED | PIGMENT RED 101 | INORGANIC | RED |
| R485 RED | PIGMENT RED 101 | INORGANIC | RED |
| R497M RED | PIGMENT RED 101 | INORGANIC | RED |
| CINQUASIA VIOLET RT-891-D | PIGMENT VIOLET 19 | ORGANIC | VIOLET |
| CROMOPHTAL VIOLET GT | PIGMENT VIOLET 23 | ORGANIC | VIOLET |
| PREMIER VU UMV (6112) | PIGMENT VIOLET 15 | INORGANIC | VIOLET |
| SICOTAN BROWN K 2750 FG | PIGMENT YELLOW 164 | INORGANIC | BROWN |
| FERRITAN FZ-1000 | PIGMENT YELLOW 119 | INORGANIC | TAN |
| NUBITERM Y-905K ZINC FERRITE | PIGMENT YELLOW 119 | INORGANIC | TAN |
| PV FAST YELLOW HG | PIGMENT YELLOW 180 | ORGANIC | YELLOW |
| IRGALITE YELLOW WGPH | PIGMENT YELLOW 168 | ORGANIC | YELLOW |
| PV FAST YELLOW HGR (11-3071) | PIGMENT YELLOW 191 | ORGANIC | YELLOW |
| PALIOTOL YELLOW K 2270 | PIGMENT YELLOW 183 | ORGANIC | YELLOW |
| CROMOPHTAL YELLOW HRPA | PIGMENT YELLOW 191:1 | ORGANIC | YELLOW |
| CROMOPHTAL YELLOW GRP | PIGMENT YELLOW 95 | ORGANIC | YELLOW |
| IRGALITE YELLOW WSR-P | PIGMENT YELLOW 62 | ORGANIC | YELLOW |
| CROMOPTHAL YELLOW 3RLP | PIGMENT YELLOW 110 | ORGANIC | YELLOW |
| 9766 FD & C YELLOW #6 | PIGMENT YELLOW 104 | ORGANIC | YELLOW |
| 9765 FD & C YELLOW #5 | PIGMENT YELLOW 100 | ORGANIC | YELLOW |
| PALIOTOL YELLOW K 0961 (HD) | PIGMENT YELLOW 138 | ORGANIC | YELLOW |
| SICOPLAST YELLOW 10-0770 | PIG YEL 138/PIG YEL 183 | ORGANIC | YELLOW |
| SICOTAN YELLOW K 2001 FG | PIGMENT BROWN 24 | INORGANIC | YELLOW |
| SICOTAN YELLOW K 1011 | PIGMENT YELLOW 53 | INORGANIC | YELLOW |
| COLORTHERM YELLOW 26 | PIGMENT YELLOW 119 | INORGANIC | YELLOW |
| COLORTHERM 10 | PIGMENT YELLOW 42 | INORGANIC | YELLOW |
| V-9118 BRIGHT GOLDEN YELLOW | PIGMENT Brown 24 | INORGANIC | YELLOW |

Table 2 shows 14 commercially available dyes.

TABLE 2

Commercial Dye Colorants

| Raw Material Name | CI Name | Family | Color |
|---|---|---|---|
| Lambdaplast Blue NL | Solvent Blue 59 | Anthraquinone | Blue |
| Macrolex Blue RR Granular | Solvent Blue 97 | Anthraquinone | Blue |
| Macrolex Green G Granular | Solvent Green 28 | Anthraquinone | Green |
| Macrolex Green 5B Granular | Solvent Green 3 | Anthraquinone | Green |
| Macrolex Orange R Granular | Disperse Orange 47 | Polymethine | Orange |
| Macrolex Orange 3G Granular | Solvent Orange 60 | Perinone | Orange |
| Macrolex Red EG Granular | Solvent Red 135 | Perinone | Red |
| Macrolex Red E2G Granular | Solvent Red 179 | Perinone | Red |
| Thermoplast Red 454 | Solvent Red 195 | Anthraquinone | Red |
| Macrolex Red Violet R Granular | Disperse Violet 26 | Anthraquinone | Violet |
| Macrolex Violet B Granular | Solvent Violet 13 | Anthraquinone | Violet |
| Macrolex Violet 3R Granular | Solvent Violet 36 | Anthraquinone | Violet |
| Key Plast Yellow 3G | Solvent Yellow 93 | Pyrazolone | Yellow |
| Key Plast Yellow AG | Solvent Yellow 114 | Quinophthalone | Yellow |

Achievement of a color match of a plaque with a desired color from the creativity of a designer or a pre-arranged color standard such as Pantone® color standards from an inventory of commercially available colorants is relatively straightforward for a skilled color matcher, even if a few iterations are required to satisfy the customer.

The colorant for use in the invention can have a particle size ranging from about 0.01 to about 10,000 micrometers, and preferably from about 0.1 to about 1000 micrometers.

Frequently, the preparation of a colored plastic article does not involve merely color but also special effect features, such as Granite, Translucent, Pearls, Metallics, Fluorescents, Iridescents, Marbles, etc.

Non-limiting examples of such additives are commercially available from PolyOne Corporation of Avon Lake, Ohio, USA (www.polyone.com) and marketed under the following brands: OnColor FX colorants, PolyOne colorants, etc.

Functional Additives

Additives to improve processing or performance of the final compound, can be added according to preferences of this skilled in the art. For example, functional additives can include anti-oxidants, anti-stats, acetaldehyde scavengers, lubricants, surfactants, biocides also known as anti-microbials, exfoliated nanoclays, and the like. Generally, minor amounts of such additives provide improvement of performance to the compound during processing or in performance by the molded article after manufacturing. One skilled in the art without undue experimentation can determine the appropriate concentration.

Blowing agents are sometimes desired to aid in foaming the resulting polymer composite for density reduction, improved mold filling and reduction of sink marks in injection molding. There are two major classes of blowing agents endothermic and exothermic. Commercial examples of endothermic blowing agents are products sold under the trade name Safoam by Reedy International, Hydrocerol by Clariant, Unicell C series by Dongjin Semichem. Commercial examples of exothermic blowing agents are Celogen series from Chemtura Corporation, Unicell D series from Dongjin Semichem. A blowing agent based on phenyltriazole chemistry is suitable for high temperature polymers like PC, PBT, glass filled polymers. Commercial examples include Celogen 5PT from Chemtura and Unicell 5PT from Dongjin Semichem.

Plastic articles exposed to natural sunlight are exposed to ultraviolet rays that can harm the color of the article. Therefore, it is customary but not required to include ultraviolet light stabilizers in a thermoplastic compound. The ultraviolet stabilizer also helps protect the polymer resin from adverse effects arising from exposure to the ultraviolet rays.

Commercially available stabilizers are well known to those skilled in the art and include thermal stabilizers and Tinuvin brand stabilizers from Ciba-Geigy of Berne, Switzerland.

Table 3 shows a chart of acceptable, desirable, and preferable concentrations of ingredients to make concentrates of the present invention.

TABLE 3

| Ingredient (Wt. %) | Acceptable Range | Desirable Range | Preferred Range |
| --- | --- | --- | --- |
| Carrier Resin | 20-65 | 25-50 | 30-40 |
| Colorant | 30-75 | 40-70 | 50-70 |
| Optional Additives | 0-40 | 0-30 | 10-20 |

Processing

The preparation of concentrates of the present invention is generally uncomplicated. The concentrate can be made in batch or continuous operations.

Mixing in a continuous process typically occurs in an extruder or a continuous mixer that is elevated to a temperature that is sufficient to melt the carrier resin with addition either at the head of the extruder or downstream in the extruder of the solid ingredient additives. Extruder speeds can range from about 50 to about 500 revolutions per minute (rpm), and preferably from about 100 to about 300 rpm. Typically, the output from the extruder is pelletized for later extrusion or molding into polymeric articles.

Mixing in a batch process typically occurs in a Banbury mixer that is also elevated to a temperature that is sufficient to melt the polymer matrix to permit addition of the solid ingredient additives. The mixing speeds range from 60 to 1000 rpm and temperature of mixing can be ambient. Also, the output from the mixer is chopped into smaller sizes for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using compounds of the present invention.

In the present invention, two measures have been taken to assure miniscule pellet sizes such that 50 pellets will weigh collectively less than 1 gram:

(a) the extruder is equipped with a 0.047 inch (0.11938 cm) 600-hole die, also known as a mini-bead die; and, preferably (b) strands emerging from the extruder are cut into microbeads using an underwater pelletizer.

USEFULNESS OF THE INVENTION

As mentioned throughout, concentrates of the present invention are extremely useful for coloration of thermoplastic biofiber composites.

The thermoplastic matrix resin of the composite is selected according to the particular use of the article being made from it. Thermoplastics are preferred over thermosets because of recycling of waste during manufacture and after useful life. Commonly thermoplastics used in wood plastic composites are chosen from polyolefins and polyvinyl chloride, although other thermoplastics are capable of being selected.

"Biofiber" means a naturally-occurring fiber or particle and used in the thermoplastic composite to give the appearance of an article made substantially from a naturally-occurring material of which the fiber or particle is one element. Non-limiting examples of biofibers are wood fibers, wood flour, other cellulosic fibers from bamboo, rice, and sugar cane. Other items broadly falling with this definition include ground newsprint, magazines, books, cardboard, wood pulps (mechanical, stone ground, chemical, mechanical-chemical, bleached or unbleached, sludge, waste fines), and various agricultural wastes (rice hulls, wheat, oat, barley and oat chaff, coconut shells, peanut shells, walnut shells, straw, corn husks, corn stalks, jute, hemp, bagasse, bamboo, flax, and kenaf).

The patent and technical literature has many publications concerning the manufacture and use of thermoplastic biofiber composites. One example of patent literature addressing polyolefin-based biofiber composites is U.S. Pat. No. 6,680,090 (Godavarti et al.), which document is incorporated by reference herein. Among manufacturers of such products is Andersen Corporation of Bayport, Minn.

The three factors for concentrates of the present invention are needed because the dispersion of color into a thermoplastic being mixed with biofibers is exceedingly challenging. It is believed that only by use of the combination of pellet size, concentrate melt flow, and concentration of colorant can one achieve the substantial color uniformity needed for a plastic article to simulate the appearance of a wood article.

With high concentration of colorant in the concentrate, one can use the concentrate in making a colored thermoplastic biofiber composite, such that the concentrate comprises between about 1 and 4 weight percent of the weight of the total composite. With that concentration range and the concentration of the colorant in the concentrate, one can compute that as little as 0.30 to as much as 2.8 weight percent of colorant is used in the thermoplastic biofiber composite, exceedingly well dispersed and substantially uniform in appearance in extruded or molded thermoplastic biofiber composites.

Further explanation of the invention is found in the Examples.

EXAMPLES

Table 4 shows the sources of the ingredients used in Examples 1 and 2 and Examples A-D which are formulations made in a conventional manner but planned to be made and sold using the manufacturing techniques employed for Examples 1 and 2. Table 5 shows the formulations. Table 6 shows the processing conditions (settings) to make Examples 1 and 2 using a Farrell Continuous Mixer connected with an extruder and an underwater pelletizer.

The resulting pellets of Examples 1 and 2 had a microbead size and achieved the goal of being so small that at least 50 of the pellets had a mass of less than one gram. The formulations of Examples A-D would achieve that microbead size also if made using the microbead die and the underwater pelletizer.

It is expected also that formulations of the melt flow index of the carrier resin in an amount at least about 20 g/min. and a concentration of at least 50 weight percent of colorant(s) extruded through a microbead die into an underwater pelletizer will yield excellent color concentrates useful to provide coloration of polyolefin-based wood-fiber filled composites that can be made into outdoor wood-simulation building materials.

TABLE 4

| Ingredient | Purpose | Chemistry | Commercial Source |
|---|---|---|---|
| 10% FURNACE BLACK (R1170, PRINT 55) | Colorant | Carbon Black | Columbian |
| 9880 METEOR PLUS HIGH IR JET BLACK | Colorant | Carbon Black | BASF |
| ANOX BB 011/IRGANOX B225 | Anti-oxidant | Phosphite Phenolic | Ciba |
| BAYFERROX 180M RED (D-8201) | Colorant | Inorganic Pigment | Bayer |
| COLORTHERM 10 | Colorant | Inorganic Pigment | Lanxess |
| COLORTHERM YELLOW 26 | Colorant | Inorganic Pigment | Lanxess |
| CO-SPEC(R1170, PRINT 55) | Colorant | Carbon Black | Columbian |
| EBS WAX-TALLOW DERIVED | Lubricant | Ethylene-Butylene-Styrene Wax | Rohm & Haas |
| ENSIGN BLUE 214 | Colorant | Inorganic Pigment | Sheperd |
| FERRITAN FZ-1000 | Colorant | Inorganic Pigment | Elementis |
| LLDPE POLYMER 20 MF PELLET | Carrier Resin | Linear Low Density Polyethylene 20 Melt Flow | Dow |
| LLDPE POLYMER 20 MF POWDER | Carrier Resin | Linear Low Density Polyethylene 20 Melt Flow | Dow |
| LUWAX AL3 | Lubricant | PE Wax | BASF |
| POLYCODE AO 1010 Pwdr HCINNAM HPHENOL | Anti-oxidant | Hcinnam Hphenol | Ciba |
| POLYCODE UV 77 Pwdr SEBACATE HALS | UV-Stabilizer | Sebacate HALS | Ciba |
| POLYCODE UV MPEP BZTRIAZOLE (234) | UV-Stabilizer | Benzotriazole | Ciba |
| PP POLYMER (H) 32 MF PELLET | Carrier Resin | Polypropylene 32 Melt Flow | Basell |
| PP POLYMER (H) 33 MF POWDER | Carrier Resin | Polypropylene 33 Melt Flow | Basell |
| R-481 RED IRON OXIDE | Colorant | Inorganic Pigment | Delta |
| R-485 RED IRON OXIDE | Colorant | Inorganic Pigment | Delta |
| R-497M RED IRON OXIDE | Colorant | Inorganic Pigment | Delta |
| TINUVIN 783 FDL | UV-Stabilizer | Hindered Amine | Ciba |
| TIONA 696 | Colorant | Inorganic Pigment | Millennium |
| TR28/RCL-188/TRONOX 470 | Colorant | Inorganic Pigment | Millennium |
| V-9118 BRIGHT GOLDEN YELLOW | Colorant | Inorganic Pigment | Ferro |

TABLE 5

| Purpose | Ingredient | 1 | 2 | A | B | C | D |
|---|---|---|---|---|---|---|---|
| Colorant | TIONA 696 | | | 5.59 | 20.00 | 4.41 | 3.34 |
| Colorant | R-485 RED IRON OXIDE | | | | | | |
| Colorant | V-9118 BRIGHT GOLDEN YELLOW | | | | | | |
| Colorant | CO-SPEC(R1170, PRINT 55) | 1.39 | 2.19 | | | 0.37 | 0.60 |
| Colorant | FERRITAN FZ-1000 | | | 17.64 | | | 22.05 |
| Colorant | R-481 RED IRON OXIDE | | 18.23 | 7.17 | | | 5.03 |
| Colorant | 10% FURNACE BLACK (R1170, PRINT 55) | | | 2.62 | | | |
| Colorant | R-497M RED IRON OXIDE | 22.92 | | | | | |
| Colorant | R-481 RED IRON OXIDE | 8.34 | | | | | |
| Colorant | TR28/RCL-188/TRONOX 470 | | 1.96 | | | | |
| Colorant | COLORTHERM 10 | | 18.23 | | | | |
| Colorant | ENSIGN BLUE 214 | | | | 2.50 | | |
| Colorant | 9880 METEOR PLUS HIGH IR JET BLACK | | | | 12.00 | | |
| Colorant | COLORTHERM YELLOW 26 | | | | | 26.46 | |
| Colorant | BAYFERROX 180M RED (D-8201) | | | | | 10.03 | |
| Stabilizer | POLYCODE UV MPEP BZTRIAZOLE (234) | | | 6.67 | | | |
| Stabilizer | POLYCODE UV 77 Pwdr SEBACATE HALS | | | 6.67 | | | |
| Stabilizer | TINUVIN 783 FDL | 5.00 | 6.25 | | | 6.25 | 8.33 |
| Anti-Oxidant | ANOX BB 011/IRGANOX B225 | 5.00 | 5.00 | 3.33 | | | |
| Anti-Oxidant | POLYCODE AO 1010 Pwdr HCINNAM HPHENOL | | | | | 2.50 | 3.33 |
| Lubricant | LUWAX AL3 | 3.00 | 3.00 | | 2.00 | | |
| Lubricant | EBS WAX - TALLOW DERIVED | | | | | | 2.00 |
| Carrier | PP POLYMER (H) 32 MF PELLET | | | 15.09 | | | |
| Carrier | PP POLYMER (H) 33 MF POWDER | | | 35.22 | | | |
| Carrier | LLDPE POLYMER 20 MF POWDER | 16.31 | 27.09 | | 31.75 | 24.99 | 27.66 |
| Carrier | LLDPE POLYMER 20 MF PELLET | 38.05 | 18.06 | | 31.75 | 24.99 | 27.66 |
| | Total | 100.00 | 100.00 | 100.00 | 100.00 | 100.00 | 100.00 |
| | Percentage Colorant | 32.65 | 40.61 | 33.02 | 34.50 | 41.27 | 31.01 |
| | Percentage Optional Additives | 13.00 | 14.25 | 16.67 | 2.00 | 8.75 | 13.67 |
| | Percentage of Resin | 54.35 | 45.14 | 50.32 | 63.50 | 49.98 | 55.32 |

TABLE 6

| Processing Condition | Example 1 | Example 2 |
|---|---|---|
| Target Rate (Lbs./Hr.) | 700 | 960 |
| Feed Rate (Kg./Hr.) | 360 | 480 |
| FCM Revolutions per Minute (RPM) | 450 | 350 |
| FCM Amp % | 70 | 70 |
| FCM Chamber Temp. (° F.) | 90 | 90 |
| FCM Hopper Temp. (° F.) | 90 | 90 |
| Orifice % Open (%) | 60 | 60 |
| FCM Melt Temp. (° F.) | 310 | 320 |
| Orifice Temp. (° F.) | 250 | 250 |
| Zone 1 Hopper Temp. (° F.) | 175 | 175 |
| Zone 2 Rear Temp. (° F.) | 260 | 260 |
| Zone 3 Vent Temp. (° F.) | 270 | 270 |
| Zone 4 Center Temp. (° F.) | 280 | 280 |
| Zone 5 Front Temp. (° F.) | 290 | 290 |
| S/C Body Temp. (° F.) | 350 | 350 |
| Die Temp. (° F.) | 375 | 350 |
| Extruder Melt Temp. (° F.) | 375 | 350 |
| Extruder RPM | 42 | 30 |
| Die Plate | Mini-Bead | Mini-Bead |
| Gala Underwater Pelletizer Water Temp. (° F.) | 120 | 120 |
| Screen Pack (Mesh) | 20 | 20 |
| Pelletizer RPM | 4300 | 4600 |

The invention is not limited to the above embodiments. The claims follow.

What is claimed is:

1. A method of making a colorant concentrate for a thermoplastic biofiber composite, comprising the steps of:
   (a) melt mixing a carrier resin selected from a group consisting of low-density polyethylene, linear-low-density polyethylene, polypropylene, and combinations thereof, colorant, and any optional additives in a chamber to form a melt concentrate;
   (b) extruding the melt concentrate through a mini-bead die; and
   (c) pelletizing the melt concentrate under water to form pellets of a shape of microbeads such that at least 50 pellets have a total mass of less than one gram,
   wherein
   (1) melt flow index of the concentrate exceeds at least 4 g/10 min. using ASTM D-1238 and
   (2) weight percent of colorant exceeds at least 30 weight percent of the weight of the concentrate.

2. The method of claim 1, wherein the colorant comprises a pigment, a dye, a combination of pigments, a combination of dyes, a combination of pigments and dye, a combination of pigment and dyes, or a combination of pigments and dyes.

3. The method of claim 1, wherein the concentrate has a minimum melt flow index of least 6 g/10 min.

4. The method of claim 1, wherein the colorant has a particle size ranging from about 0.01 to about 10,000 micrometers.

5. The method of claim 1, further comprising additives providing special features selected from the group consisting of granites, translucents, pearlescents, metallics, fluorescents, iridescents, marbles, and combinations thereof.

6. The method of claim 1, further comprising functional additives selected from the group consisting of anti-oxidants, anti-stats, acetaldehyde scavengers, blowing agents, waxes, ultraviolet light stabilizers, lubricants, surfactants, biocides, anti-microbials, exfoliated nanoclays, and combinations thereof.

7. The method of claim 1, wherein the amount of carrier resin ranges from about 20 to about 65 weight percent of concentrate.

* * * * *